Figure 1:
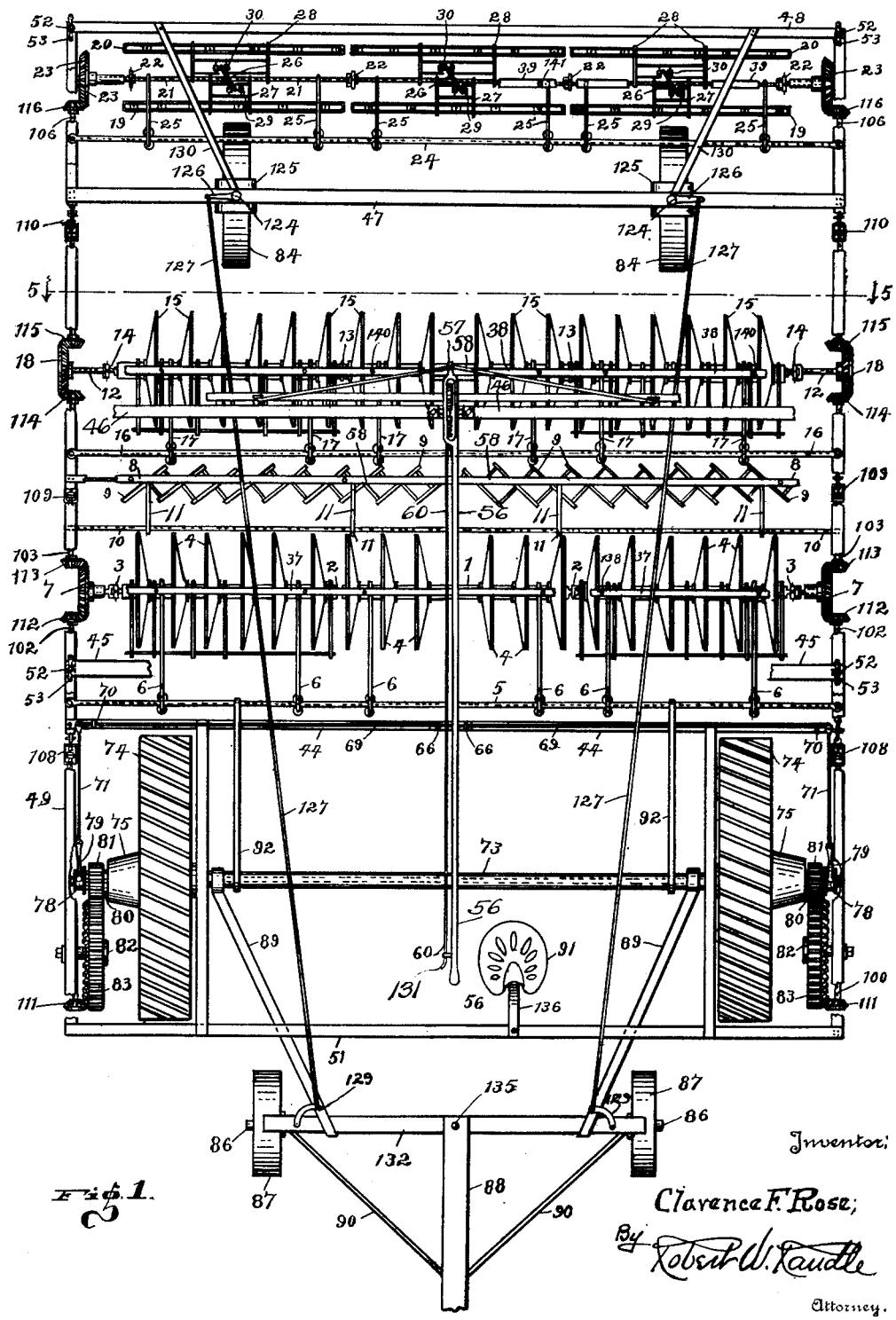

March 25, 1930.　　　C. F. ROSE　　　1,751,887

SOIL WORKING COMBINE

Filed April 5, 1928　　　4 Sheets-Sheet 1

Inventor:
Clarence F. Rose;
By Robert W. Raudle
Attorney.

March 25, 1930. C. F. ROSE 1,751,887
SOIL WORKING COMBINE
Filed April 5, 1928 4 Sheets-Sheet 2

March 25, 1930.  C. F. ROSE  1,751,887
SOIL WORKING COMBINE
Filed April 5, 1928   4 Sheets-Sheet 4

Inventor:
Clarence F. Rose;
By Robert N. Laudle
Attorney.

Patented Mar. 25, 1930

1,751,887

UNITED STATES PATENT OFFICE

CLARENCE F. ROSE, OF NEAR MODOC, INDIANA

SOIL-WORKING COMBINE

Application filed April 5, 1928. Serial No. 267,699.

This invention relates to an agricultural machine adapted to be propelled or drawn over the ground by either mechanical or animal power, whereby the transit thereof over the ground will accomplish as much, or more, than that of several tools or machines separately operated at different times with relation to each other.

Broadly stated, my object is to provide a machine for preparing plowed ground for planting, the same being comparatively simple in its construction, positive in practice, easily operated by one person, efficient in its results, thorough in its accomplishments, adapted to perform a plurality of essential operations with one transit of the machine over the ground, and which can be manufactured, sold, and operated at a comparatively low price.

Heretofore, in preparing plowed ground for planting, it has been customary to disk the ground, then drag it to fill in the interstices and level it off, following with a second disking, and finally harrowing the ground.

The exact order of said operations and the number thereof are not essential and they are frequently varied from the above, depending somewhat on the condition of the ground, the weather, and even upon the opinion of the operator or owner.

It is evident that when said operations are performed separately there will be a considerable interval of time between the operations, requiring a number of different tools, and a great amount of lost time in changing from one to the other of the tools, but with my machine all of said operations are accomplished at one operation, or simultaneously, thereby requiring but one operator and but one source of power, and without transfers from one set of tools to another.

It should also be understood that when separate tools are used frequently a large amount of time and labor is totally lost, as for instance: Suppose that one, two, or more of said operations have been done before the field is planted, and at that time a heavy rain comes on, then all of said operations which have been done will be lost, and the work would have to be done over after the ground has sufficiently dried.

But with my plan the work of my machine may be followed up just after the breaking of the ground, and then the planting may follow immediately after my machine, and then if rain comes on all that is required is to stop operations until the ground has properly dried, but there will be no work lost or to be done over, as the planting will be completed right up to my machine, and the rain will only do it good, and without any labor being lost.

It is evident that the results just stated could not be had with the operations divided into a number of separate operations transpiring at various intervals of time.

Although not a part of this invention, I contemplate that a seeding machine, such as a wheat drill or a corn planter, may be operated in connection with the rear portion of my machine, and even a breaking plow may be mounted to the forward portion of my machine and operated in conjunction therewith.

Figure 2:
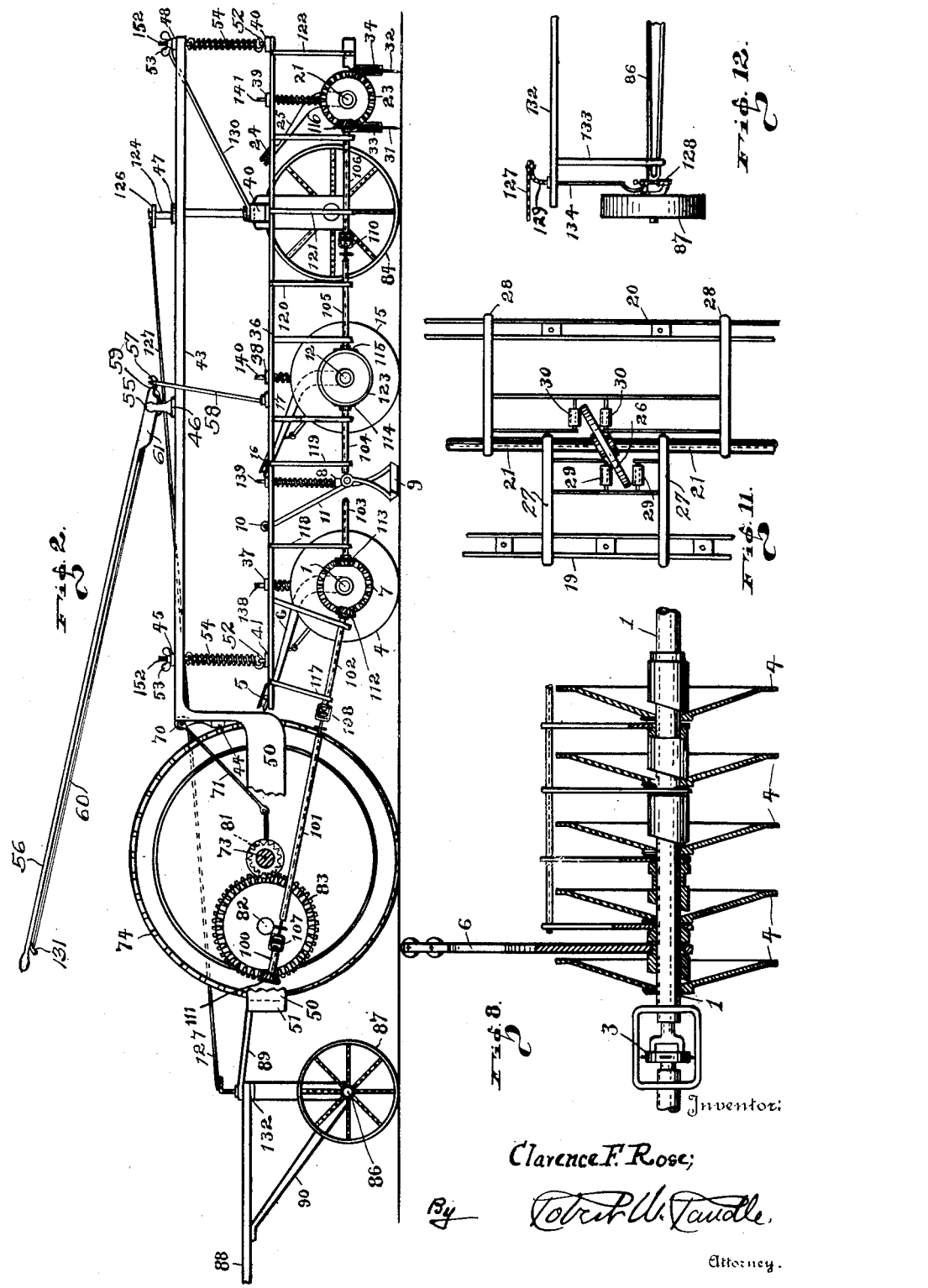
Figure 3:
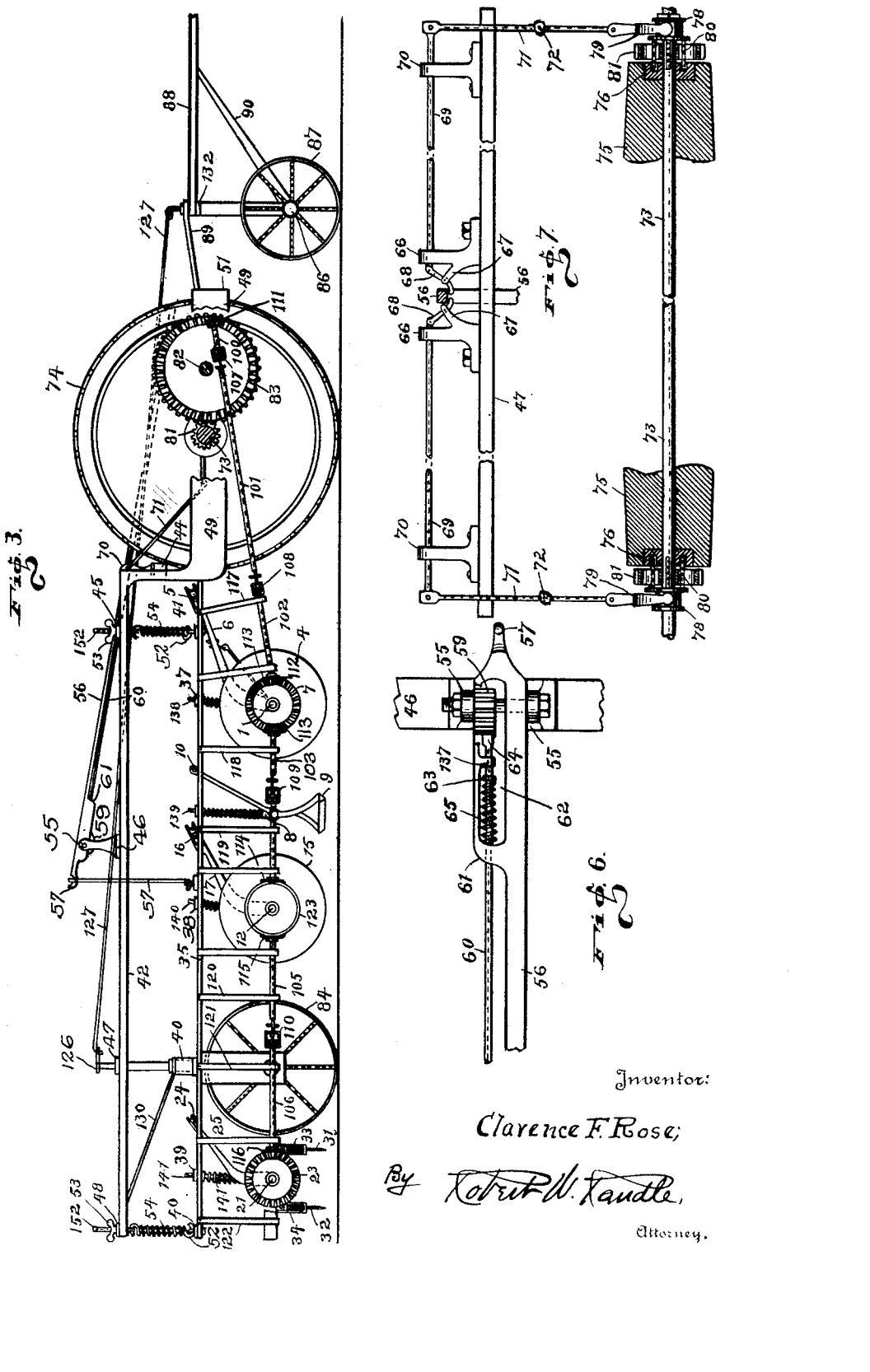
Figure 4:
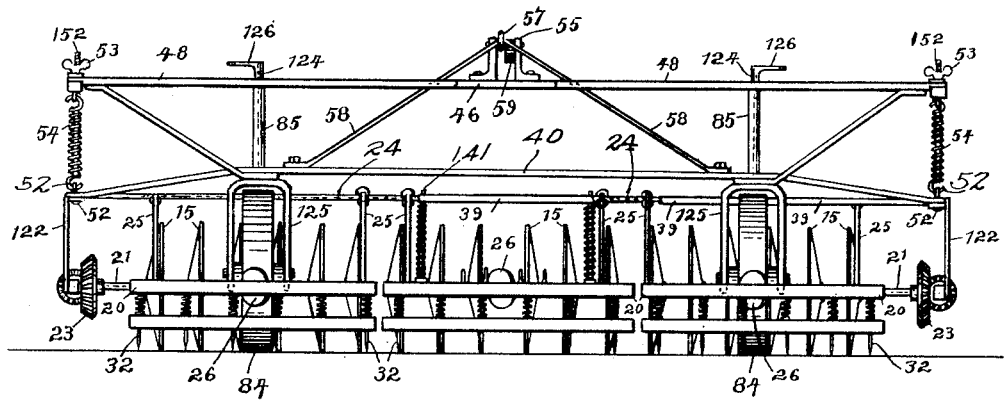
Figure 5:
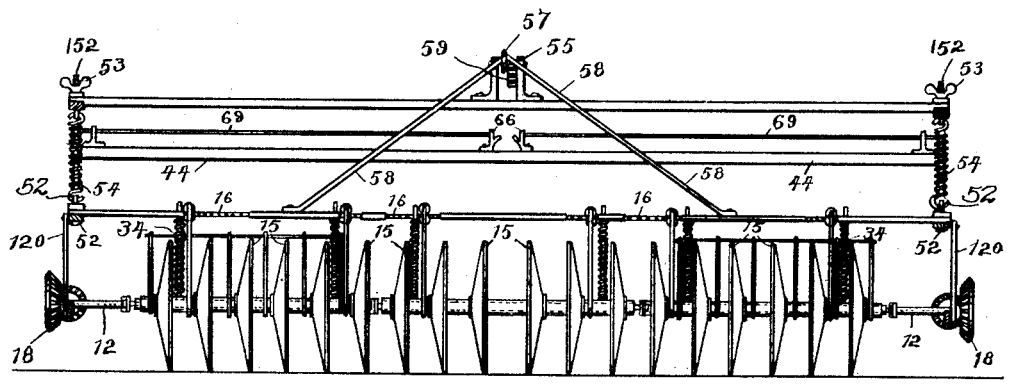
Figure 9:
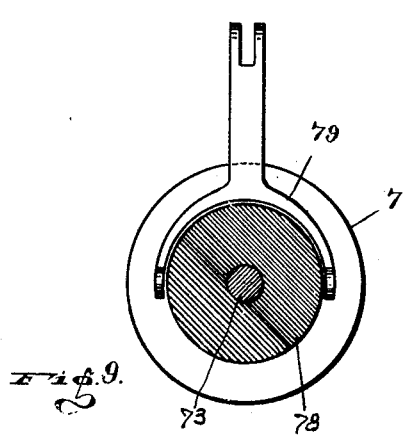
Figure 10:
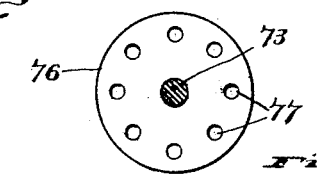

Other objects and particular advantages of my invention will suggest themselves in the course of the following description. One manner of carrying out the principles of my invention in a practical and efficient manner is shown in the accompanying four sheets of drawings, in which—Figure 1 is a diagrammatic plan view of my entire machine, certain parts being omitted or broken away in order to show parts therebelow. Figure 2 is a side elevation of my machine, showing the same in operative position, that is with the tools down in contact with the ground. Figure 3 is also a side elevation of the same, but showing the opposite side of the machine, and showing the tools raised and out of gear. Figure 4 is a rear elevation of the machine. Figure 5 is a cross section, as taken on the line 5—5 of Fig. 1. Figure 6 is a detail plan view of the inner or rear portion of the raising and lowering lever and its securing means. Figure 7 is a side elevation of one of the gear-shifting mechanisms. Figure 8 is an enlarged detail view of a portion of one set of disking tools, showing the same in vertical section. Figure 9 is a side view of one of the gear-shifting yokes. Figure 10 is a face view of a gear-shifting disc. Figure 11 is an enlarged detail of one of the wobble wheels and the frames which it operates, and Figure 12 is a front elevation of a portion of the steering mechanism at one side of the machine.

Similar indices denote like parts throughout the several views.

In order that the construction, the operation, and the several advantages of my machine may be the more fully understood and appreciated, I will now take up a detailed description thereof, in which I will set forth the same as comprehensively as I may. My invention comprises the following described elements combined into a unitary structure, substantially as herein set forth:—

*Main frame or chassis.*—This consists of the two side members 42 and 43, and a plurality of cross members 44, 45, 46, 47 and 48, all rigidly secured together. The front portion of said frame is offset downward, forming the respective side extensions 49 and 50, which are rigidly connected at their front ends by the member 51. Extending across between the members 49 and 50 is the main drive shaft 73, on the end portions of which is secured the two drive wheels 74, each having an outwardly extending hub 75. In the center of the end of each hub 75 concentric with the shaft 73, is secured a plate 76 in which is formed a plurality of apertures 77, arranged in a circle concentric with its plate. Slidably and revolvably mounted on the shaft 73 is a channeled collar 78, at each side of the machine, that is, one near each plate 76. As shown in Fig. 7, a yoke 79 is provided for each collar 78, with the prongs of the yokes striding and slidably operative in the channel of the respective collars. A rod 71 is rigidly secured to and extends upward from each yoke. Projecting from the inner face of each collar 78 is a plurality of pins 80, corresponding in number with the number of apertures 77 and into which they are adapted to enter, to place the machine in gear.

Also slidable on the shaft 73 and contiguous with the face of the collar 78 is a gear pinion 81, with said pins 80 extending slidably therethrough, whereby the collar 78 and the pinion 81 are locked together.

A stub shaft 82 extends from each of the members 49 and 50, on each of which is revolvably mounted a comparatively large gear wheel 83. Each of said gear wheels 83 has a horizontal gear on its periphery, and an angular gear on its side and adjoining said horizontal gear. The said horizontal gears mesh with the respective gear pinions 81, and the angular gears are for the purpose hereinafter set forth.

It will be observed that the forward portion of the main frame is supported by the drive wheels 74. The rear portion of the main frame is supported by the guide wheels 84, the bearings for which extend down from the cross member 47. Said bearings each comprises a tubular stem 85, on which the member 47 rests. Operative in the stem 85 is the shaft 124, which extends upward through and above the member 47. A pronged member 125 is formed integral with the lower end of the stem 85, and the wheel 84 is revolvably mounted in said pronged member. Formed integral with the upper end of each shaft 124 is a horizontal arm 126, to which latter is pivoted the rear end of the rod 127, which latter extends forward to where it is pivoted to its respective arm 129. The stems 85 are retained in position by the braces 130, which connect the lower portions of said stems with the main frame. The pilot truck mechanism comprises the axle 86, which carries on its ends the stub-shafts 128, as shown in Fig. 12, on which are mounted the respective ground wheels 87.

Extending upward from near the ends of the axle 86 are the standards 133, to the upper ends of which are secured the plates 132. Extending upward from the respective stub shafts 128, are the vertical stems 134, whose upper ends are integral with the respective arms 129, above mentioned, whereby the wheels 84 are controlled, as to their direction of travel, by means of the wheels 87, turning opposite thereto.

Numeral 88 denotes the tongue, or other steering means, which by reason of the pivot 135 is attached to the center of the said horizontal plate 132 of the pilot truck.

Said member 132 is connected to the shaft 73 by means of the diverging pull-bars 89. And the stubs 128 are connected to the tongue 88 by the angularly disposed hounds 90.

Numeral 91 denotes the driver's seat which is supported by the spring bar 136 which extends upward and rearward from the member 51.

The lower frame of my machine comprises the side members 35 and 36, and a plurality of ties, or cross members, 37, 38, 39, 40 and 41.

The lower frame is of the same width as is the upper frame, and the rear ends of the two frames are substantially even with each other, but the lower frame is of less length, as it extends forward only to near the said offset in the upper frame, that is to near the member 49 and 50.

The lower frame is resiliently suspended under the upper frame by means of a plurality of coil springs 54, there being, at least, one near each corner.

The lower ends of said springs are secured to the lower frame in any well known manner. The upper ends of said springs are adjustably attached to the upper frame by the hanger hook and eye bolts 52, which are made adjustable by means of the fly-nuts 53, for adjusting the tension of said springs.

*Lifting device.*—Mounted on and in the center of the member 46 is a bearing bracket 55, in which is pivoted the rear portion of the lever 56. The extreme rear end of the lever 56 terminates in a hook 57. Extending convergently upward from the members 35 and 36, through the enclosure of the upper frame, is a bail 58, in the angle at the center of which is attached the hook 57. Secured to the bracket 55 is a segmental rack 59 (Fig. 6) designated by numeral 59, the same having notches in its periphery. Extending along the side of the lever 56 is a pull rod 60. The rear portion of the lever 56 is enlarged on one side, forming a shoulder 61, and a longitudinal slot 62 is formed through said enlargement, and a collar 63 is secured on the rod 60, within the slot 62. Said rod 60 extends through an aperture in the shoulder 61 and on the inner end of the rod 60 a plunger or head 64 is formed, which head is adapted to enter either of the notches in the periphery of the rack 59, to retain the lever 56 in the position where it may be left by the operator, but adapted to be released by simply pulling the rod 60 against the resiliency of the spring 65. A guide 137 extends into the slot 62, from the said enlarged portion of the lever 56, through which guide the rod 60 slidably operates. Said spring 65 surrounds the rod 60, with its ends seated against the shoulder 61 and the collar 63, whereby the head 64 is normally pressed into engagement with the rack 59. A small lever 131 is pivoted to the lever 56, near its handle portion, whereby pressure upon said small lever will draw the head 64 out of engagement with the rack, as said lever 131 has the outer end of the rod 60 attached thereto.

From the above it will be seen that by operating the lever 56 the lower frame may be raised and lowered as desired.

The clutch operating mechanism, shown in Fig. 7, includes a double membered bracket secured in the center of the member 47, the same comprising the two upright members 66, and the inturned fingers 67. A rod 69 operates endwise in each of said uprights 66. A link 68 is pivoted in each of the fingers 67, and the longer end portions of said fingers 67 are pivoted to their respective rods 69. Said rods 69 extend laterally in opposite directions to each other. Also mounted on the member 47, near the ends thereof, are the hangers 70, in which the rods 69 are slidably mounted. Pivoted to and extending downward from the outer ends of the rods 69 are the connecting rods 71, whose central portions are pivoted at 72 to some stationary part of the upper frame.

Thus when it is desired to place the machine out of gear one has only to press the lever 56 downward to its limit, thereby raising the lower frame and also at the same time moving the collars 78 outward and thereby withdrawing the pins 80 from engagement with the apertures 77, and thereby placing the machine out of gear.

*Longitudinal side shafts.*—One of these shafts is suspended from each side of the lower frame, and as they are identical with each other I will describe but one and the like parts of the other will be designated by like numerals.

Each of said shafts comprises sections 100, 101, 102, 103, 104, 105 and 106. Said shafts are divided by joints 107, 108, 109 and 110. The forward end of section 100 carries a miter pinion 111, which meshes with the side or angular gear of the gear-wheel 83, above mentioned. The rear end of section 102 carries a miter gear pinion 112, which meshes with a miter gear wheel 7. The forward end of the section 103 carries a miter gear pinion 113 which also meshes with the miter gear wheel 7. The rear end of section 104 carries a miter gear pinion 114 which meshes with the miter gear wheel 18. The forward end of section 105 carries a miter gear pinion 115 which meshes with the miter wheel 18. And the rear end of section 106 carries a miter gear pinion 116 which meshes with the bevel gear wheel 23. In this connection it should be noticed that the bevel wheels 7 are secured on the ends of the shaft 1. The bevel wheels 18 are secured on the ends of shaft 12. And the bevel wheels 23 are secured on the end of shaft 21.

Said longitudinal shafts are suspended from the lower frame by means of a plurality of forked hangers 117, 118, 119, 120, 121 and 122. It should also be understood that all of said joints, gears and pinions are, in actual practice, to be covered or enclosed by suitable housings, as for instance the housing 123, shown in Figs. 2 and 3 which cover the gear wheel 18.

The shaft section 101 is made expansible, by means of a telescoping device, comprising a case 160, which is round in cross section, having a square aperture 161 (Fig. 15) in each end thereof, with the adjoining end portions of the shaft 101 formed square and fitting slidably in said apertures. The ends of the shaft 101, inside the case 160, has a head, 162, secured thereto, as in Fig. 14.

From the above it is apparent that the two sections of the shaft member 101 will at all times be carried revolvably together, yet at the same time permitting longitudinal movements thereof with relation to each other.

*The front disking tool.*—This includes the semi-flexible shaft 1, which has intermediate universal joints 2, and the end universal joints 3.

Mounted on the shaft 1 is a plurality of concave disks 4, those on one half of the shaft 1 being concaved to the right and those on the other side being concaved to the left. And said disks are adapted to be operated at various angles.

Extending across, horizontally, in front of said disks is a bar 5, which is secured on the lower frame and extends between the sides thereof. Numeral 6 denotes a plurality of pull-arms, the same having their forward ends roller-mounted to the bar 5, whereby they can move laterally, while their rear ends have bearings in which the shaft 1 revolves. And, as above stated, the outer ends of the shaft 1 have bevel-gear wheels 7 secured thereon.

*The drag tool.*—This comprises a cross-bar 8, from which is suspended a plurality of small drag plates 9, all of which are set at an angle, angling to the right on one side and to the left on the other side of the center of the cross-bar 8.

Numeral 10 denotes a cross-rod, which is carried by the lower frame. A plurality of pull-arms 11 connect the bar 8 with the rod 10. The bar 8 is located downward and rearward, with relation to the rod 10.

*The rear disking tool.*—This comprises the semi-flexible shaft 12, having intermediate universal joints 13, and having the end universal joints 14. Mounted on the shaft 12 is a plurality of concave disks 15, those on one side of the center of the machine being concave in one direction and those on the other side being concave in the other direction. Extending horizontally across in front of the disks 15 is a cross-bar 16. Numeral 17 denotes pull-arms, there being six in this instance, the same having their forward ends roller mounted to the bar 16 whereby they may move laterally, while their rear ends carry bearings in which may revolve the shaft 12. Each end of the shaft 12 has secured thereon a bevel-gear wheel 18. And said disks are adapted to be operated at various angles with relation to the forward movements of the machine.

*The harrow.*—This includes the frame members 19 and 20, with a shaft 21 extending between said members, and although all are connected together yet the shaft 21 is free to revolve, and the members 19 and 20 are free to slide endwise independently of each other.

Said shaft 21 is made semi-flexible by means of a plurality of universal joints 22 therein. Secured on each end of the shaft 21 is a bevel-gear wheel 23. Numeral 24 denotes a cross-bar.

A plurality of pull-arms 25 are roller-mounted at their forward ends to the cross-bar 24, and the shaft 21 revolves in bearings located on the rear ends of the pull-arms 25.

Mounted on the shaft 21 are a plurality of wobble-wheels 26. For each of said wobble wheels 26 the members 19 and 20 carry a frame, as the respective frames 27 and 28, which frames are slidable on the shaft 21, that is to say, said shaft 21 revolves in sliding bearings carried thereby. Each of the frames 27 and 28 carries a pair of rollers 29 and 30, respectively, and the wobble wheels operate between the members of each pair of said rollers as is indicated in Fig. 11.

By means of the above described construction it will be seen that when the shaft 21 is revolved that the wobble wheels will cause the members 19 and 20 to move alternately to the right and the left and in opposite directions with relation to each other, whereby the harrow teeth will form entwined zig-zag lines in the loose soil, as the machine is moved thereover.

As above intimated, a plurality of harrow teeth 31 and 32, are secured to and extend down below the respective members 19 and 20. Each of said teeth is spring mounted, whereby they may be moved upward against the resiliency of the respective springs 33 and 34, shown in Figs. 2 and 3.

*Operation*

The operation of my machine is comparatively simple, for instance: In Fig. 3 the machine is shown out of gear, that is the lever 56 has been moved down to its limit, thereby raising the lower frame for lifting all of the tools from the ground, and at the same time the lever 56 will be between the lower ends of the links 68, pressing them apart and thereby pulling the pins 80 out of engagement with the notches 77, which manifestly will release the clutches. This will allow the machine to be drawn over the ground without operating the tools and without their contacting with the ground.

Then when it is desired to operate the machine one has only to move the lever 56 upward, as in Fig. 2, thereby automatically placing the clutches in gear and simultaneously lowering the tools into contact with the ground whereby they will operate as set forth.

After the tools have been lowered, with the clutches automatically placed in engagement, then the machine may be drawn over the ground, with the disks 4 cutting, pulverizing, and shifting the soil, the drag smoothing the soil and leveling it; the disks 15 following and again shifting and pulverizing the soil; and then with the harrow following and mixing the soil into condition for planting.

All of said operations follow each other in quick succession whereby the soil is, in one operation, prepared for planting.

As the breaking or plowing of the ground precedes immediately ahead of my machine, and as all of the said operations of my machine are performed in one operation, and as the planting of the seeds follows immediately after my machine, therefore it is evident that the soil will have no chance to desiccate or dry out, and by reason of which the seeds will be planted in moist soil, even though the surface of the soil be comparatively dry when the work is started, thereby causing the seeds to germinate more quickly than would be possible where said operations are protracted, as with my machine the soil will not lose moisture between the operations. When the machine reaches the end of the course, then one has only to press the lever 56 downward to its limit, which will raise the tools from the ground and place the machine out of gear, after which it may be easily turned in a very small space, for the reason that if the wheels 87 be directed to the right then the wheels 84 will be automatically turned to the left, and vice versa. It is to be understood that when the machine is being moved forward, with the clutches in gear, and of course with the wheels 74 in contact with the ground, that the two sets of disks, 4 and 15, will be rotated by power and at a speed greater than their normal speed by simple contact with the ground. Also the harrow will be given lateral oscillating movements, by reason of the wobble wheels 26, which are mounted on the shaft 21 and rotated by the side shafts. By reason of the semi-flexible cross-shafts of the individual sets of tools, and the longitudinal side shafts, it is evident that the tools are thereby enabled to adjust themselves to the ground. The individual sets of tools are adapted to be raised from the ground, without the lower frame, by reason of the respective hanger bolts 138, 139, 140 and 141, which bolts also have coiled springs thereon which are also adapted to press the tools into the ground, or at least holding them resiliently in operative position. It is to be understood that various changes may be made in the several details herein set forth and in the arrangement thereof, without departing from the spirit of my invention or sacrificing any of the advantages thereof which are new and useful.

Having now fully shown and described my invention, what I claim and desire to secure by Letters Patent of the United States, is—

1. A soil working machine comprising an upper frame including, an extension projecting forward from said main portion and located on a level lower than the main portion, rear guide wheels supporting the rear portion of said frame, drive wheels supporting the forward portion of said frame, a truck attached to the forward end of said frame, front guide wheels carrying said truck, means for automatically turning said rear guide wheels by the turning of the front guide wheels and in directions opposite thereto, a lower frame resiliently suspended below the main portion of the upper frame, a plurality of soil working tools carried by the lower frame, and means for operating said tools with power generated by the rotation of said drive wheels traveling on the ground.

2. A soil working machine comprising a main upper frame including, an extension integral with the forward end of the main frame and located on a lower level with relation thereto, rear guide wheels supporting the rear portion of the main frame, drive wheels supporting said extension of the main frame, a truck attached to the forward end of said extension, front guide wheels pivoted to said truck, means for automatically controlling the direction of travel of the rear guide wheels by the turning of the front guide wheels and in directions opposite thereto, a lower frame suspended below the main frame, a plurality of soil working tools carried by the lower frame, means for operating said tools by power developed by the rotation of the drive wheels over the ground, and means for placing the machine into and out of gear.

3. A soil working machine comprising a main frame having a forward extension located on a lower level, a pair of ground wheels pivotally connected to the rear portion of the main frame, drive wheels connected with said extension and supporting the main frame and its extension, guide wheels mounted in front of said extension, means for controlling the rear ground wheels in their direction of travel by the turning of the guide wheels, a lower frame suspended below the main frame and in the rear of said extension, a plurality of soil working tools connected to the lower frame, means for operating certain of said tools by the rotation of said drive wheel over the ground, means for placing said operating means into and out of gear, and means whereby said lower frame may be manually raised and lowered.

4. A soil working machine comprising a main frame including, an extension integral with the forward end of the main frame and located on a lower level with relation thereto, rear ground wheels supporting the rear portion of the main frame, drive wheels supporting the said extension and the forward end of the main frame, a truck connected to the forward end of said extension, front guide wheels pivoted to said truck, means for connecting said ground wheels and the guide wheels whereby they will turn laterally in unison but in directions opposite to each other, a lower frame suspended from the main frame; disking tools, a drag tool and a harrowing tool suspended from the lower frame, a shaft for each of said tools, gear wheels operable from the shaft of the drive wheels, a sectional shaft extending rearward on each side of the lower frame and geared to the shafts of said tools and to said gear wheels, and means for placing said sectional shafts into and out of gear.

5. In a soil working machine comprising a main frame, a lower frame suspended from the main frame; a harrowing tool suspended by the lower frame and including a shaft extending across said frame, wobble wheels mounted on said shaft, rear frames extending back from said shaft, front frames extending forward from said shaft, means whereby the wobble wheels will drive said frames alternately to the right and the left and alternately with relation to each other, means for revolving said shaft by the operation of the machine over the ground, and teeth extending downward from each of said frames to engage the soil over which the machine travels.

6. A soil working combine comprising in a single unit an upper frame including, an extension projecting forward and located on a lower plane with relation thereto, ground wheels pivoted to the rear portion of the upper frame, tractor wheels supporting the extension and the forward part of the upper frame, a pilot truck device attached to the forward portion of the said extension, pivoted guide wheels supporting said pilot truck member, means for automatically turning said ground wheels with the turning of the guide wheels, a lower frame suspended from the upper frame, a plurality of soil working tools carried by the lower frame, means for operating said tools by power from the tractor wheels, means for placing the operation of said tools into and out of gear, and means for manually raising and lowering the lower frame.

In testimony whereof I affix my signature.

CLARENCE F. ROSE.